United States Patent
Sprechmann et al.

(10) Patent No.: US 12,242,947 B2
(45) Date of Patent: Mar. 4, 2025

(54) MACHINE LEARNING SYSTEMS WITH MEMORY BASED PARAMETER ADAPTATION FOR LEARNING FAST AND SLOWER

(71) Applicant: DeepMind Technologies Limited, London (GB)

(72) Inventors: Pablo Sprechmann, London (GB); Siddhant Jayakumar, London (GB); Jack William Rae, London (GB); Alexander Pritzel, London (GB); Adrià Puigdomènech Badia, London (GB); Oriol Vinyals, London (GB); Razvan Pascanu, London (GB); Charles Blundell, London (GB)

(73) Assignee: DeepMind Technologies Limited, London (GB)

( * ) Notice: Subject to any disclaimer, the term of this patent is extended or adjusted under 35 U.S.C. 154(b) by 1187 days.

(21) Appl. No.: 16/759,561

(22) PCT Filed: Oct. 29, 2018

(86) PCT No.: PCT/EP2018/079559
§ 371 (c)(1),
(2) Date: Apr. 27, 2020

(87) PCT Pub. No.: WO2019/081782
PCT Pub. Date: May 2, 2019

(65) Prior Publication Data
US 2020/0285940 A1    Sep. 10, 2020

Related U.S. Application Data

(60) Provisional application No. 62/578,319, filed on Oct. 27, 2017.

(51) Int. Cl.
*G06N 3/045* (2023.01)
*G06N 3/02* (2006.01)
(Continued)

(52) U.S. Cl.
CPC ............ *G06N 3/045* (2023.01); *G06N 3/02* (2013.01); *G06N 3/04* (2013.01); *G06N 3/044* (2023.01); *G06N 3/084* (2013.01)

(58) Field of Classification Search
None
See application file for complete search history.

(56) References Cited

U.S. PATENT DOCUMENTS

2003/0033347 A1* 2/2003 Bolle .................... G06F 16/786
                                                          707/E17.022
2014/0358546 A1* 12/2014 Fernandez ............ G10L 15/063
                                                          704/263
(Continued)

OTHER PUBLICATIONS

Graves et al., "Hybrid Computing Using a Neural Network with Dynamic External Memory" Oct. 12, 2016, doi: 10.1038/nature20101, pp. 471-476. (Year: 2016).*
(Continued)

*Primary Examiner* — Philip J Chea
*Assistant Examiner* — Bin Qing Zheng
(74) *Attorney, Agent, or Firm* — Fish & Richardson P.C.

(57) ABSTRACT

There is described herein a computer-implemented method of processing an input data item. The method comprises processing the input data item using a parametric model to generate output data, wherein the parametric model comprises a first sub-model and a second sub-model. The processing comprises processing, by the first sub-model, the input data to generate a query data item, retrieving, from a memory storing data point-value pairs, at least one data point-value pair based upon the query data item and modifying weights of the second sub-model based upon the
(Continued)

retrieved at least one data point-value pair. The output data is then generated based upon the modified second sub-model.

21 Claims, 4 Drawing Sheets

(51) Int. Cl.
   *G06N 3/04* (2023.01)
   *G06N 3/044* (2023.01)
   *G06N 3/084* (2023.01)

(56) References Cited

U.S. PATENT DOCUMENTS

2017/0024645 A1* 1/2017 Socher .................. G06N 3/042
2017/0228637 A1* 8/2017 Santoro ................. G06N 3/063

OTHER PUBLICATIONS

Gu et al., "Search Engine Guided Non-Parametric Neural Machine Translation" May 20, 2017, arXiv:1705.07267v1. (Year: 2017).*
Kumar et al., "Ask Me Anything: Dynamic memory Network for Natural Language Processing" Mar. 5, 2016, arXiv: 1506.07285v5. (Year: 2016).*
Turchi et al., "Continuous Learning from Humans Post Edits for Neural Machine Translation" Jun. 1, 2017, doi: 10.1515/pralin-2017-0023, (Year: 2017).*
Aharoni et al., "Gradual Learning of Deep Recurrent Neural Networks," CoRR, Aug. 2017, https://arxiv.org/abs/1708.08863v1, 7 pages.
Anselmi et al., "Unsupervised learning of invariant representations with low sample complexity: the magic of sensory cortex or a new framework for machine learning?" CoRR, Mar. 2014, https://arxiv.org/abs/1311.4158v5, 23 pages.
Ba et al., "Using Fast Weights to Attend to the Recent Past," Advances in Neural Information Processing Systems 29 (NIPS 2016), 2016, 9 pages.
Bahdanau et al., "Neural Machine Translation by Jointly Learning to Align and Translate," CoRR, Sep. 2014, ahttps://arxiv.org/abs/1409.0473v1, 15 pages.
Blundell et al., "Model-Free Episodic Control," CoRR, Jun. 2016, https://arxiv.org/abs/1606.04460, Jun. 2016, 12 pages.
Farajian et al., "Multi-Domain Neural Machine Translation through Unsupervised Adaptation," Proceedings of the Conference on Machine Translation (WMT), Sep. 2017, 127-137.
Finn et al., "Model-Agnostic Meta-Learning for Fast Adaptation of Deep Networks," CoRR, Mar. 2017, https://arxiv.org/abs/1703.03400v3, 13 pages.
Fortunato et al., "Bayesian Recurrent Neural Networks," CoRR, Apr. 2017, https://arxiv.org/abs/1704.02798v2, 11 pages.
French, "Catastrophic forgetting in connectionist networks," Trends in Cognitive Sciences, Apr. 1999, 3(4):128-135.
Furlanello et al., "Active Long Term Memory Networks," CoRR, Jun. 2016, https://arxiv.org/abs/1606.02355, 10 pages.
Goodfellow et al., "Maxout Networks," CoRR, Feb. 2013, https://arxiv.org/abs/1302.4389v4, 9 pages.
Grave et al., "Improving Neural Language Models with a Continuous Cache," CoRR, Dec. 2016, https://arxiv.org/abs/1612.04426, 9 pages.
Gu et al., "Search Engine Guided Non-Parametric Neural Machine Translation," CoRR, May 2017, https://arxiv.org/abs/1705.07267v1, 11 pages.
He et al., "Deep Residual Learning for Image Recognition," 2016 IEEE Conference on Computer Vision and Pattern Recognition (CVPR), Jun. 2016, pp. 770-778.
Hinton et al., "Distilling the Knowledge in a Neural Network," CoRR, Mar. 2015, https://arxiv.org/abs/1503.02531, 9 pages.
Hochreiter et al., "Long Short-Term Memory," Neural Computation, Nov. 1997, 9(8): 1735-1780.
Kaiser et al., "Learning to Remember Rare Events," CoRR, Mar. 2017, https://arxiv.org/abs/1703.03129, 10 pages.
Kingma et al., "Adam: A Method for Stochastic Optimization," CoRR, Dec. 2014, https://arxiv.org/abs/1412.6980v1, 9 pages.
Kirkpatrick et al., "Overcoming catastrophic forgetting in neural networks," Proceedings of the National Academy of Sciences, Mar. 2017, 114(13):3521-3526.
Krause et al., "Dynamic Evaluation of Neural Sequence Models," CoRR, Sep. 2017, https://arxiv.org/abs/1709.07432v2, 10 pages.
Krizhevsky et al., "ImageNet Classification with Deep Convolutional Neural Networks," Advances in Neural Information Processing Systems 25 (NIPS 2012), 2012, 9 pages.
Kumaran et al., "What Learning Systems do Intelligent Agents Need? Complementary Learning Systems Theory Updated," Trends in Cognitive Sciences, Jul. 2016, 20(7):512-534.
LeCun et al., "Gradient-Based Learning Applied to Document Recognition," Proceedings of the IEEE, Nov. 1998, 86(11):2278-2324.
Leibo et al., "Approximate Hubel-Wiesel Modules and the Data Structures of Neural Computation," CoRR, Dec. 2015, arxiv.org/abs/1512.08457, 13 pages.
Li et al., "Learning Without Forgetting," IEEE Transactions on Pattern Analysis and Machine Intelligence, Nov. 2017, pp. 2935-2947.
Li et al., "One Sentence One Model for Neural Machine Translation," CoRR, Sep. 2016, arxiv.org/abs/1609.06490, 7 pages.
Lopez-Paz et al., "Gradient Episodic Memory for Continual Learning," 31st Conference on Neural Information Processing Systems, Jun. 2017, 10 pages.
Marcus et al., "Building a Large Annotated Corpus of English: The Penn Treebank," Computational Linguistics, Oct. 1993, 19(2):313-330.
McClelland et al., "Why There Are Complementary Learning Systems in the Hippocampus and Neocortex: Insights From the Successes and Failures of Connectionist Models of Learning and Memory," Psychological Review, 1995, 102(3):419-457.
McCloskey et al., "Catastrophic Interference in Connectionist Networks: The Sequential Learning Problem," Psychology of Learning and Motivation, 1989, 24:109-165.
Melis et al., "On the State of the Art of Evaluation in Neural Language Models," CoRR, Jul. 2017, arxiv.org/abs/1707.05589v1, 7 pages.
Merity et al., "Pointer Sentinel Mixture Models," CoRR, Sep. 2016, arxiv.org/abs/1609.07843, 13 pages.
Merity et al., "Regularizing and Optimizing LSTM Language Models," CoRR, Aug. 2017, arxiv.org/abs/1708.02182, 10 pages.
Metz et al., "Unrolled Generative Adversarial Networks," CoRR, Nov. 2016, arxiv.org/abs/1611.02163v1, Nov. 2016, 19 pages.
Mnih et al., "Human-level control through deep reinforcement learning," Nature, Feb. 2015, 518(7540):529-533.
Munkhdalai et al., "Meta Networks," CoRR, Mar. 2017, arxiv.org/abs/1703.00837v2, 11 pages.
PCT International Preliminary Report on Patentability in International Appln. No. PCT/EP2018/079559, mailed May 7, 2020, 10 pages.
PCT International Search Report and Written Opinion in International Appln. No. PCT/EP2018/079559, mailed Feb. 4, 2019, 16 pages.
Pritzel et al., "Neural Episodic Control," CoRR, Mar. 2017, arxiv.org/abs/1703.01988, 12 pages.
Ravi et al., "Optimization as a Model for Few-Shot Learning," ICLR, Nov. 2016, 11 pages.
Russakovsky et al., "ImageNet Large Scale Visual Recognition Challenge," International Journal of Computer Vision, Apr. 2015, 115(3):211-252.
Santoro et al., "One-shot Learning with Memory-Augmented Neural Networks," CoRR, May 2016, arxiv.org/abs/1605.06065, 13 pages.
Silver et al., "Mastering the game of Go without human knowledge," Nature, Oct. 2017, 550(7676):354-359.

(56) References Cited

OTHER PUBLICATIONS

Snell et al., "Prototypical Networks for Few-shot Learning," 31st Conference on Neural Information Processing Systems, Jun. 2017, 11 pages.
Sprechmann et al., "Memory-based Parameter Adaptation," CoRR, Feb. 2018, arxiv.org/abs/1802.10542, 16 pages.
Turchi et al., "Continuous Learning from Human Post-Edits for Neural Machine Translation," The Prague Bulletin of Mathematical Linguistics, Jun. 2017, 108(1):233-244.
Van den Oord et al., "WaveNet: A Generative Model for Raw Audio," CoRR, Sep. 2016, arxiv.org/abs/1609.03499v2, 15 pages.
Vinyals et al., "Matching Networks for One Shot Learning," Advances in Neural Information Processing Systems 29, 2016, 9 pages.
Weston et al., "Memory Networks," CoRR, Oct. 2014, arxiv.org/abs/1410.3916v1, 15 pages.
Wu et al., "Google's Neural Machine Translation System: Bridging the Gap between Human and Machine Translation," CoRR, Sep. 2016, arxiv.org/abs/1609.08144v2, 23 pages.
Zhang et al., "Character-level Convolutional Networks for Text Classification," Advances in Neural Information Processing Systems 28, 2015, 9 pages.

\* cited by examiner

MACHINE LEARNING SYSTEMS WITH MEMORY BASED PARAMETER ADAPTATION FOR LEARNING FAST AND SLOWER

CROSS-REFERENCE TO RELATED APPLICATIONS

This application is a National Stage Application under 35 U.S.C. § 371 and claims the benefit of International Application No. PCT/EP2018/079559, filed Oct. 29, 2018, which claims priority to U.S. Application No. 62/578,319, filed Oct. 27, 2017, the entire contents of which are hereby incorporated by reference herein.

BACKGROUND

This specification relates to systems and methods implementing a memory structure in a machine learning system such as an artificial neural network.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

Neural networks can be used in various ways. For example, neural networks are often used as part of a reinforcement learning system in which an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

SUMMARY

This specification describes methods and systems which may be implemented as computer programs on one or more computers in one or more locations for processing an input data item.

In broad terms a neural network function approximator as described herein comprises a neural network coupled to an auxiliary or episodic memory. The neural network slowly learns to output an approximate function of an input to the network whilst the auxiliary memory allows the function approximator to adapt quickly to new information. Thus the neural network, which may include a convolutional or recurrent neural network, has an input, typically a vector, and an output and is trained so that the output approximates a function of the input, using a loss function. The auxiliary memory is coupled to receive an intermediate output from the neural network, which represents a feature or embedding of the input to the neural network. The auxiliary memory produces a memory output in response to the feature or embedding at a memory input. The memory output is used to temporarily adapt the parameters (weights) of one or more layers of the neural network, preferably one or more output layers of the neural network. These one or more layers may thus be a sub-network of the neural network. The adapted parameters are used to produce an output from the neural network function approximator, for example at inference time, but the modifications to these parameters may then be discarded. The parameters may be slowly changed by training the neural network using any suitable loss function, for example in the usual manner.

The memory output may comprise one or more memory values for use in approximating the function; the values may be, for example, memory values representing probabilities such as logits. The memory output provides a local context for the input, that is because the memory output is derived from a lookup using the input memory output is likely to be relevant to the input. Using an intermediate feature to perform the lookup makes it more likely that the lookup employs a semantically meaningful feature of the input.

The lookup is preferably a soft lookup, based on similarity between the feature or embedding at the input and stored features indexing the memory values. The memory output may therefore comprise multiple values, each weighted by a corresponding similarity function or kernel which measures the similarity of an indexing element or key to an input query. The indexing elements or keys of the memory may have the same format as the lookup feature/embedding.

In principle the values retrieved from the memory could simply be averaged or combined in a weighted average, for use in determining a function approximator output value. However this can be improved upon. Thus in some implementations the parameters of the neural network, more particularly the parameters of the sub-network part of the neural network may be adapted using the memory values whilst generating the function approximator output, but preferably only temporarily. In this way the function approximator the values stored in the memory can be used to correct the output of the neural network before the parameters of neural network have been trained to approximate new data; the neural network learns to approximate the new data over slower time. A gradient descent method may be used to adapt the parameters of the sub-network, preferably starting from the current parameters of the neural network sub-network. This may adapt the parameters of the sub-network so that the output of the neural network function approximator more closely approximates a function defined by the values stored in the memory. For example a suitable loss function may comprise a weighted sum or average of differences between the values stored in the memory and those provided by the sub-network; the weights may be defined by a measure of similarity between the query feature/embedding and the key or indexing features of the memory. Optionally gradients from this training may be backpropagated beyond the sub-network to adapt parameters of the neural network in layers before the intermediate output, which may help the neural network to learn useful representations.

Values may be stored in the auxiliary memory using any of a variety of strategies. For example a new entry may be made every time a new feature/embedding is encountered; or every time a new feature/embedding is encountered which is different to an existing key by more than a threshold measure. The values may be stored during training. The values stored depend upon the application; for example in a classification task a value may be a classification or classification probability, or in a reinforcement learning task that stored value may be, for example, a 1-step or n-step Q-value estimate.

The auxiliary memory may be physically or logically separate from the neural network and/or distributed, for example across one or more data repositories. Where the memory is trained it may be trained in conjunction with or separately from the neural network. In some implementations the auxiliary memory may be a differentiable memory such as the Differentiable Neural Dictionary described in "Neural Episodic Control", Pritzel et al, arXiv:1703.01988. However it is not essential that the memory be differentiable because gradients need not flow back through the memory. Although Pritzel et al, describes a memory used with a neural network, the method/systems described here are different, for example because they use the memory to change weights of the neural network rather than using the output of the memory directly.

Although in some implementations the function approximator comprises a neural network other models with adaptable parameters may also be employed, for example a regression model. Thus more generally in the above description the neural network may be replaced by a model which models the output function and the auxiliary memory may be employed to adapt parameters of a subset of the model.

The approximated function may be any function. For example the system may implement a classifier and the function may define a probability that an input belongs to a class. Alternatively the input may define a sequence such as a sequence of words or parts of words in a natural language, or a waveform or encoded waveform; preferably the neural network then comprises a recurrent neural network.

In some implementations the neural network function approximator may comprise part of a reinforcement learning system. Thus the input may comprise an observation of a real or simulated environment, or data characterizing a current state of the environment. The output may then indicate an action to be performed by the agent operating in the environment in response to the received data. The output may identify a particular action, or may provide a probability distribution over a set of possible actions, or may provide a Q-value for an action. The environment may be a real-world environment; the agent may be a mechanical agent such as a robot interacting with the environment to accomplish a specific task or an autonomous or semi-autonomous vehicle navigating through the environment; the actions may be control outputs to control the robot or the autonomous vehicle.

In still other examples the real-world environment may be a manufacturing plant or service facility, the observations may relate to operation of the plant or facility, for example to resource usage such as power consumption, and the agent may control actions or operations in the plant/facility, for example to reduce resource usage.

In some other applications the agent may control actions in an environment comprising items of equipment, for example in a data center or grid mains power or water distribution system, or in a manufacturing plant. Then the observations may comprise observations of power or water usage by equipment, or observations of power generation or distribution control, or observations of usage of a resource or of waste production. The agent may control actions in the environment to increase efficiency, for example by reducing resource usage, and/or reduce the environmental impact of operations in the environment, for example by reducing waste.

In a first aspect there is provided a method of processing an input data item. The method may comprise processing the input data item using a neural network to generate output data, wherein the neural network comprises a first sub-network and a second sub-network. The first and second sub-networks may comprise successive neural network processing stages of the neural network. The processing may comprise: processing, by the first sub-network, the input data to generate a query data item; retrieving, from a memory storing data point-value pairs, at least one data point-value pair based upon the query data item; modifying the second sub-network based upon the retrieved at least one data point-value pair; and generating the output data based upon the modified second sub-network to generate the output data.

More generally, however, the input data item may be processed according to the above method using any sort of parametric model, such as a regression model, comprising a first sub-model and a second sub-model. At least the second sub-model should have continuous parameters or weights.

Thus in some implementations the method/system modifies weights of the second sub-model during inference, although the weights may also be modified during training. Preferably but not essentially the weights are modified temporarily, and may be reset to their previous values after modification for inference. This can provide advantages as described later including more accurate inference with reduced training, reduced model for example neural network size, and reduced compute requirements.

In some implementations modifying the second sub-network comprises modifying the weights of the second sub-network whilst leaving the inputs to the second sub-network unchanged. The weights may be modified temporarily based on the memory retrieval, to allow the system/method to rapidly adapt for inference, but the original weights, or a close approximation of these, may then be replaced to allow learning (training) to take place in slower time. Thus the modified weights (temporarily) modify a parametric model, in some implementations a neural network, but there may be no memory-based change to the input/source of data for the second sub-network, which is still the output of the first sub-network. Instead the weights may be adapted in response to a stored local context for the input data item retrieved from the memory. The memory output may be indexed by features of the input, which may be learned features. Local context may refer to a process weighting memory outputs by the similarity of their indexing features to one or more corresponding features extracted from the input.

Modifying the second sub-network based upon the retrieved at least one data point-value pair may comprise generating a plurality of weights for the second sub-network. Generating weights may comprise initializing and/or adapting weights of the second sub-network. That is, weights of the second sub-network may be modified based on an output from the memory prior to processing the input data or data generated therefrom. The weights are typically weights associated with nodes of the sub-network. For example, the second sub-network may be trained in an initial training phase in any convenient way. The weights of the trained second sub-network may then be modified based upon data obtained from the memory.

The plurality of weights may be generated based upon a relationship between a data point and a value of the data point-value pairs. Modifying the second sub-network based upon the retrieved at least one data point-value pair may comprise minimizing a loss function. The loss function may be based upon a relationship between the at least one data point-value pair and the second sub-network. The loss function may be further based upon the query data item. For example, the loss function may be weighted based upon a relationship between the query data item and the data point-value pair. The weighting may, for example, weight data point-value pairs that have a high degree of similarity to the query data item highly such that the influence of the data point-value pairs having a high degree of similarity is relatively high, whereas data point-value pairs that have a low degree of similarity to the query data item may have a relatively low weight.

For example, a set of weights θ for the second subset may be determined by minimizing a local version of the negative log-likelihood (NLL):

$$\theta^x = \underset{\theta}{\mathrm{argmin}} L(x, \theta, D) \text{ with}$$

$$L(x, \theta, D) = \sum_{i=1}^{N} K(f_\gamma(x), h_i) \left( g_\theta(h_i)_{y_i} - \log\left(\sum_{k=1}^{c} e^{g_\theta(h_i)_k}\right) \right)$$

where:
K is a smoothing kernel that weights the importance of each of the at least one data point-value pairs $h_i$, $y_i$ based upon its similarity to the query data item $f_\gamma(x)$ corresponding to a hidden layer of the first sub-network;
γ is the weights of the first sub-network;
$e^{g_\theta(h_i)_k}$ is the k-th component of a logit vector produced by the second sub-neural network;
D is the memory.

The weights may be generated using gradient descent, for example by performing a fixed number of gradient descent steps.

The query data item may comprise a hidden state of the first sub-network. The memory may comprise an episodic memory. The episodic memory may be a memory that stores data associated with previously processed input data items. The query data item may be used to determine a predetermined number of most similar entries in the memory. The data point-value pair may for example comprise a data point of the data point-value pair associated with a hidden state of the first sub-network and a value of the data point-value pair associated with output of the second sub-network for the a data point-value pair data point. The query data item may be used to perform a look up operation in the memory to identify data point-value pairs having a data point most similar to the query data item. Alternatively, each data point-value pair may be used in a minimization operation as described above, with weights for each data point-value pair being determined based upon similarly between the data point of the data point-value pair and the query data item. Each data point-value pair of the episodic memory may comprise a hidden layer and output value obtained during processing of a previous input data item.

The first sub-network may comprise a first plurality of first neural network layers and the second sub-network comprises one or more second neural network layers. An output or uppermost layer of the first sub-network may provide an input for the second sub-network. In some implementations the number of first neural network layers is greater than the number of second neural network layers. That is, the first sub-network may be larger and/or more complex than the second sub-network. The one or more second neural network layers may be the final layers of the neural network.

The method may further comprise resetting the second sub-network after the output data is generated based upon the modified second sub-network. For example, the weights of the second subset may be reset to a value prior to being adapted based on the retrieved at least one data point-value pair. The input data item may be processed as part of a reinforcement learning system.

The input data item may be a data item associated with data of a category selected from the group consisting of: image data, video data, motion data, speech data, audio data, an electronic document, data representing a state of an environment and data representing an action. A plurality of data items may be processed as part of an online learning process. The neural network may, for example, comprise a language modelling system, image processing system, action selection system.

In a second aspect there is provided a neural network system for processing an input data item implemented by one or more computers, the neural network system comprising: a memory storing a plurality of data point-value pairs; and a neural network comprising a first sub-network and a second sub-network; wherein the first sub-network is configured to process the input data item to generate a query data point; and wherein the second sub-network is modified based upon at least one data point-value pair, the data point-value pair being retrieved from the memory based upon the query data point; wherein the neural network is configured to generate output data based upon the modified second sub-network.

In a third aspect there is provided a system comprising one or more computers and one or more storage devices storing instructions that when executed by the one or more computers cause the one or more computers to perform the operations of the respective method of the first aspect.

In a fourth aspect there is provided one or more computer storage media storing instructions that when executed by one or more computers cause the one or more computers to perform the operations of the respective method of the first aspect.

In a fifth aspect there is provided one or more computer storage media storing instructions that when executed by one or more computers cause the one or more computers to implement the system of the third aspect.

The neural networks can be configured to receive any kind of digital data input and to generate any kind of score, classification, or regression output based on the input.

For example, if the inputs to the neural network are images or features that have been extracted from images, the output generated by the neural network for a given image may be scores for each of a set of object categories, with each score representing an estimated likelihood that the image contains an image of an object belonging to the category.

As another example, if the inputs to the neural network are Internet resources (e.g., web pages), documents, or portions of documents or features extracted from Internet resources, documents, or portions of documents, the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, if the input to the neural network is a sequence representing a spoken utterance, the output generated by the neural network may be a score for each of a set of pieces of text, each score representing an estimated likelihood that the piece of text is the correct transcript for the utterance.

The subject matter described in this specification can be implemented in particular embodiments so as to realize one or more of the following advantages.

A method for augmenting neural networks with a memory, such as an episodic memory may be provided so as to allow for rapid acquisition of new knowledge while preserving high performance and good generalization. The first and second sub-networks may provide a parametric model and the memory may provide a non-parametric model and the subject matter may therefore provide for combination of both parametric and non-parametric. The weights of the first sub-network may adapt to input data items slowly, whereas the weights of the second sub-network may allow rapid adaptation to new data items. The neural network can therefore generally learn slowly leading to strong performance and generalization, whilst still allowing rapid adaptation to newly seen data. By resetting the second sub-network after processing a data item, long term consequences of adaptation to newly seen data can be avoided where it is undesirable.

The method/systems described here are different to Pritzel et al, ibid, for example because they use the memory to change weights of the neural network rather than using the output of the memory directly.

In some implementations the memory-augmented neural network systems and methods described herein are able to operate effectively without needing access to large training data sets. They can also adapt to changes in the task they are performing such as changes in the data distribution. For example they can perform effectively with only a fraction of the training data which would normally be needed. Thus the memory-augmented neural network systems and methods described can enable substantial reductions in the memory storage and computing power needed for an effective system. The memory-augmented neural network systems and methods described herein are also able to operate with unbalanced training data, that is with training data in which different types of examples are not equally represented. This is a common characteristic of real-world data, and thus the systems and methods described herein are able to operate more effectively with real-world data than some other systems. They are also able to adapt to incremental changes in input data distribution, for example in a task which involves continual learning.

Thus one advantage of the described systems and methods is that they are able to adapt to different tasks, for example the introduction of one or more new classes in a classification system, or a shift in an input data distribution. The change from one task to another may be gradual or stepwise. The system can adapt quickly to a change and then more slowly learn to improve generally on the task.

Additionally, in some implementations, the described techniques allow the data point-value pairs that are retrieved using the query to be stored in memory, e.g., in RAM, instead of on disk, e.g., on a hard drive. Thus, querying the data point-value pairs can be done with minimal latency, allowing the described systems to generate outputs with comparable speed to existing systems but with much better accuracy because of the modification to the weights made by based on the retrieved data point-value pairs. In particular, because the size of the memory, i.e., the maximum number of pairs that can be stored at any given time, can be fixed to a number of data point-value pairs that can fit in memory, e.g., in RAM, the described systems can ensure that the data point-values can be efficiently and quickly queried.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
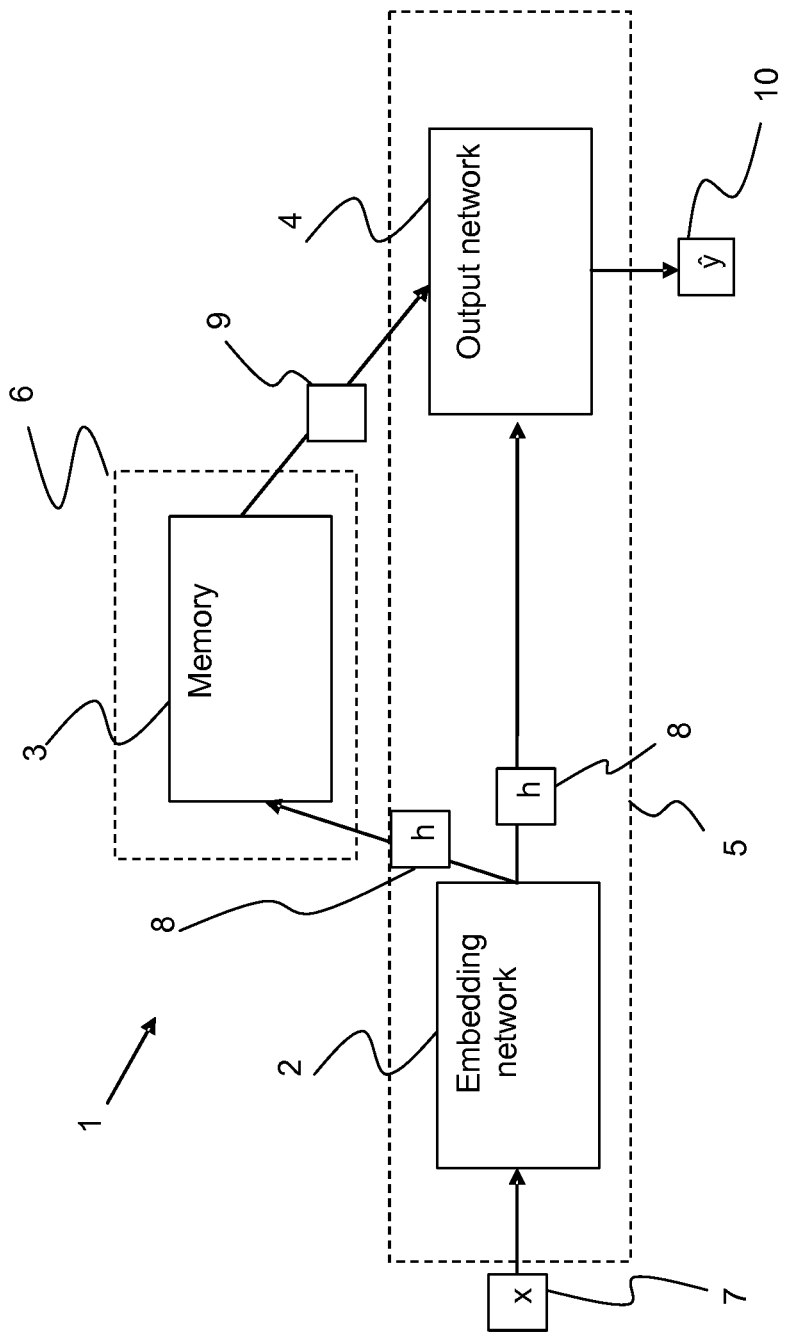
FIG. 1 shows a schematic of a neural network system during inference.

FIG. 1 shows a schematic of a neural network system 1 during inference according to an implementation. The neural network system 1 may be implemented as one or more computer programs on one or more computers in one or more locations.

The neural network system 1 comprises an embedding network 2, a memory 3 and an output network 4. The embedding network 2 and the output network 4 form a parametric component 5 of the system and the memory 3 forms a non-parametric component 6 of the system. The neural network system 1 is used during inference to process input data 7 to generate output data 10. In particular, input data 7 is processed by the embedding network 2 to generate a query data item 8 and the query data item 8 is used to query the memory 3. A returned query 9 from the memory 3 is used to modify the output network 4. In particular, such modification may relate to modifying parameters of the output network 4. The output data 10 may then be generated based on the modifications made to the output network 4. For example, the query data item 8, output by the embedding network 2, may be processed by the output network 4 having the modified parameters so as to output the output data 10.

Figure 2:
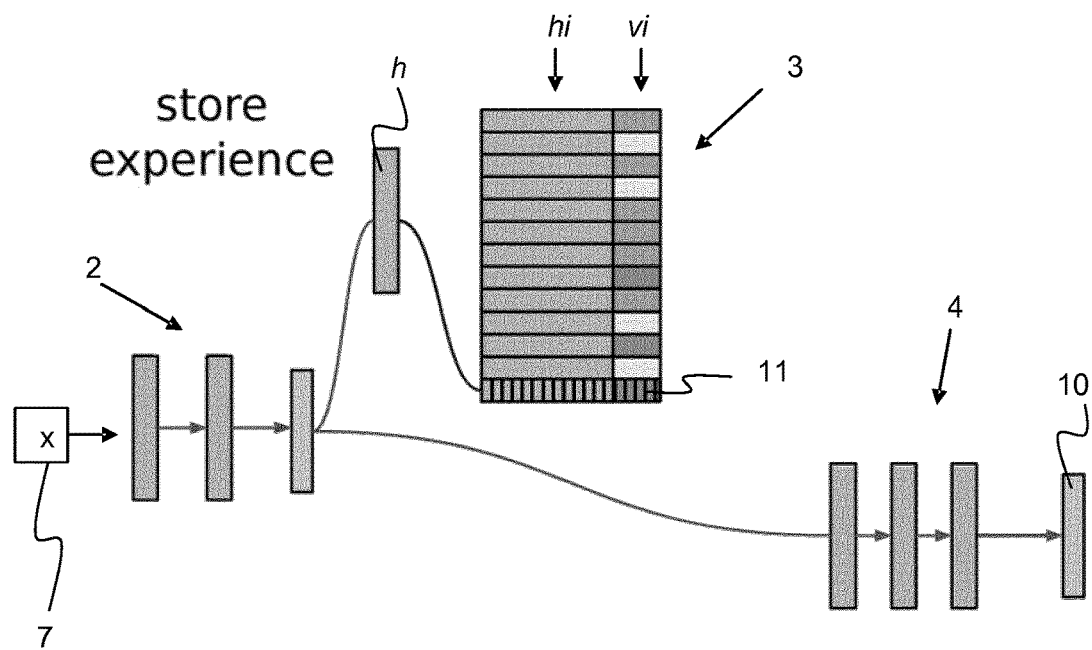
FIG. 2 shows a schematic of the neural network system during training.
Figure 4:
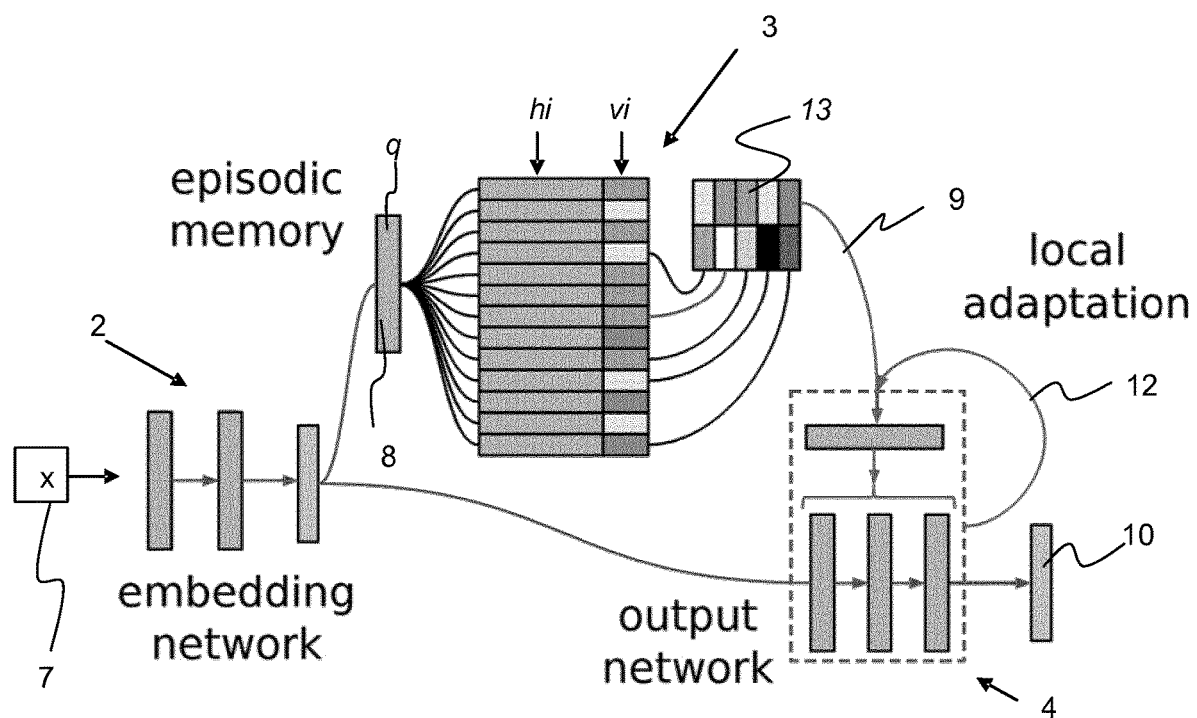
FIG. 4 shows a schematic of the neural network system during inference.

FIG. 2 shows a specific implementation of the neural network system 1 during training and FIG. 4 shows the specific implementation of the neural network system 1 during inference. In the implementation shown, the embedding network 2 (which notationally may be written as $f_\gamma$), and the output network 4 (which notationally may be written as $g_\theta$), are standard parametric (feed forward or recurrent) neural networks with parameters, $\gamma$ and $\theta$, respectively. That is, $\gamma$ and $\theta$ are the weights of the neural networks $f_\gamma$ and $g_\theta$. The memory 3 is a dynamically-sized memory module that stores key, $h_i$, and value, $v_i$, pairs, $M=\{(h_i; v_i)\}$, where each pair relates to a specific input $x_i$. Thus the memory may store episodic memories, i.e. data relating to specific training examples which have previously been presented to the system.

The memory 3 may store the key and value pairs in an append only fashion, and thus the memory size may increase (up to a limit) as new data items are stored. The keys $\{h_i\}$ are given by the embedding network 2 and the values $\{v_i\}$ correspond to a desired output $y_i$. For classification, $y_i$ may be the true class label, whereas for regression, $y_i$ may be the true regression target. The size of the memory may depend on the number of training examples, for example it may be capable of storing 1% or more of the training examples.

The neural network system 1 is used differently depending on whether the system 1 is being trained or used in inference. During training of the neural network system 1, for a given input x, the conditional likelihood of an output, y, given an input, x, may be parameterized with a deep neural network given by the composition of the embedding network 2, $f_\gamma$, and the output network 4, $g_\theta$. Thus the conditional likelihood may be given by:

$$p_{train}(y|x,\gamma,\theta)=g_\theta(f_\gamma(x))$$

In the case of classification, the last layer of the output network 4 is configured to be a softmax layer. The parameters $\gamma$ and $\theta$ may be estimated by maximum likelihood estimation, using for example back propagation.

During training of the neural network system 1, data derived from observed data, x, which is used to train the system 1 is also stored to the memory 3. For example, upon observing a j-th example, $x_j$, the memory 3 is updated by appending 11 the corresponding pair $(h_j, v_j)$ to the memory 3, where:

$$h_j \leftarrow f_\gamma(x_j)$$

$$v_j \leftarrow y_j$$

The memory 3 may have a fixed size and act as a circular buffer, such that when it is full, the oldest data is overwritten first. Subsequent retrieval from the memory 3, described later, may comprise performing a K-nearest neighbor search on the keys $\{h_i\}$ with e.g. Euclidean distance to obtain the K most similar keys and associated values.

Figure 3:
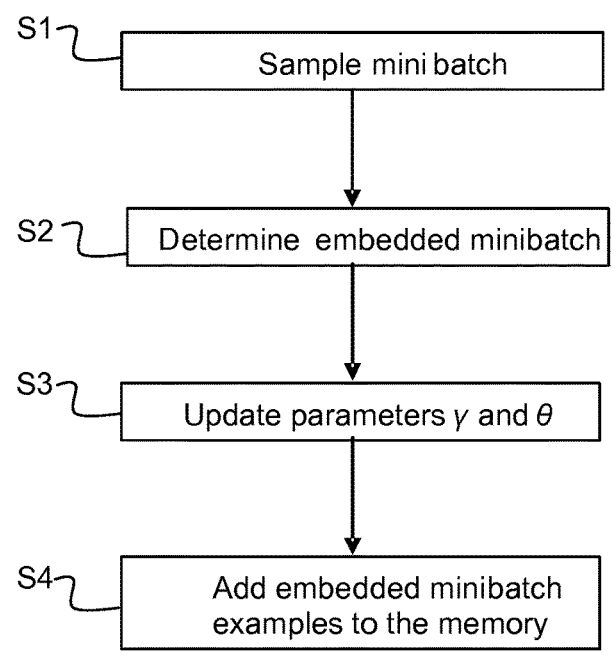
FIG. 3 is a flow diagram of an example process for training the neural network system of FIGS. 1 and 2.

With reference to FIG. 3, there is now described a method for training the neural network system 1.

At step S1, a mini-batch of one or more training examples $B=\{(x_b, y_b)\}_b$ is sampled from training data.

At step S2, an embedded mini-batch $B'=\{(f_\gamma(x_b), y_b): x_b, y_b \in B\}$ is determined using the embedding network 2, $f_\gamma$.

At step S3, the parameters $\gamma$ and $\theta$ are updated by maximizing the likelihood of $\gamma$ and $\theta$ with respect to the mini-batch of examples B.

At step S4, the embedded mini-batch examples B' are added to the memory 3, $M:M \leftarrow M \cup B'$.

As can be seen from FIG. 2, in implementations the memory 3 stores data from the examples during training but at training time it is not used in generating an output from the system, nor is the stored data used for training. Thus in implementations it is not necessary for the memory to be differentiable.

FIG. 4 shows an example of the neural network system 1 during use in inference.

During use in inference the embedding network 2 receives an input x and the embedding network 2 processes x to generate a key embedding h for the input x. The key embedding h output from the embedding network 2, which may be written as query $q=f_\gamma(x)=h$, is used to query the memory 3 and obtain the returned query 9. The returned query 9 from the memory 3 is used to modify the parameters $\theta$ of the output network 4. The returned query 9 may, in an implementation, indicate the K nearest key embeddings 13 in the memory 3 to the current key embedding h according to a distance measure, such as Euclidean distance using, for example, a kernel function. Optionally an approximate nearest neighbor search, such as a k-NN search, may be used. In the schematic representation show in FIG. 4, five nearest neighbors are retrieved from the memory. However, it will be appreciated that any suitable number of nearest neighbors may be retrieved. The nearest neighbors are combined in a weighted sum to provide the returned query. The weights of the weights sum may correspond to the distance measure i.e. to the kernel function for the corresponding value.

In an implementation, the returned query 9 defines a context C of an input x, where the context C input x is defined as the keys $h_i$, values $v_i$ and associated weights $w_i$ of the K nearest neighbors 13 to the query $q=f_\gamma(x)$. The associated weights $w_i$ may be determined by the system 1 from distances between the K nearest key embeddings 13 and the current key embedding h. Thus the context C may be written as:

$$C=\{(h_k^{(x)}, v_k^{(x)}, w_k^{(x)})\}_{k=1}^K$$

In an implementation, the weights are dependent upon a similarity between the query and the stored keys. For example in some implementations $w_k^{(x)} \propto \text{kern}(h_k^{(x)}, q)$, where $\text{kern}(h_k^{(x)}, q)$ is a kernel function dependent upon the closeness of the query to each key $h_k$ in the set of nearest neighbor keys to (x). The weights may be normalized, i.e. divided by the sum of $\text{kern}(h_k^{(x)}, q)$ over the nearest neighbors. An example kernel function is:

$$\text{kern}(h_k^{(x)}, q) = \frac{1}{\epsilon + \|h - q\|_2^2}$$

where $\epsilon$ is a predetermined constant to avoid a division by zero. The neural network system 1 can therefore select K key embeddings in the memory 3 that have the shortest distances to the current key embedding h according to the kernel function.

Using the context C described above, the parametrization of the likelihood of an output, y, given an input, x, takes the form:

$$p(y|x,\theta^x) = p(y|x,\theta^x,C) = g_{\theta^x}(f_\gamma(x))$$

where $\theta^x$ are the weights of the output network 4 as modified by the weighted values read from the memory 3, i.e. as modified by a soft read from the memory 3.

Thus the parameterization of the likelihood differs from the standard parametric approach $g_\theta(f_\gamma(x))$, used during training and described above, in that $\theta$ has been replaced with $\theta^x$. In implementations $\theta^x = \theta + \Delta_M(x, \theta)$, with $\Delta_M(x, \theta)$ being a contextual update of the parameters of the output network 4, e.g. being based upon the input x. Updating of parameters according to the $p(y|x, \theta^x)$ corresponds to decreasing the weighted average negative log-likelihood over the retrieved neighbors in C.

In implementations the parameters of the output network 4 are only modified temporarily during inference. The soft read from the memory applies a correction $\Delta_M(x, \theta)$ to the parameters of the output network which is dependent upon the specific input presented to the system at that time. However this "local adaptation" is afterwards discarded, allowing the weights of the parametric part of the system, that is of the embedding and output networks, to learn slowly thus facilitating generalization and long-term improved performance. As the model becomes better at fitting the training data the correction diminishes.

Given input x and context C, the maximum a posteriori likelihood of $\theta^x$ over the context C, given the parameters $\theta$ obtained after training, can be written as:

$$\max_{\theta^x} \log p(\theta^x | \theta) + \sum_{k=1}^{K} w_k^{(x)} \log p(v_k^{(x)} | h_k^{(x)}, \theta^x, x)$$

The second term is a weighted likelihood of the data in C; the superscript (x) on the weights denotes that these depend on the particular input x. The first term can be thought of as a regularization term. For example in some implementations $$\log p(\theta^x | \theta) \propto -\frac{\|\theta^x - \theta\|_2^2}{2\alpha_M}$$

i.e. a Gaussian prior on $\theta^x$ centered at $\theta$, where $\alpha_M$ is the learning rate, which inhibits $\theta^x$ from moving too far away from $\theta$ to help prevent overfitting.

A fixed number of gradient descent steps, including just one, may be carried out to minimize the maximum a posteriori over the context C, where the fixed number of steps is represented by loop 12 in FIG. 4. One step of gradient descent to the loss in the maximum a posteriori over the context C with respect to $\theta^x$ yields:

$$\Delta_M(x, \theta) = -\alpha_M \nabla_\theta \sum_{k=1}^{K} w_k^{(x)} \log p(v_k^{(x)} | h_k^{(x)} \theta^x, x) - \beta(\theta - \theta^x)$$

where $\alpha_M$ is the learning rate and $\beta$ is a scalar hyper-parameter which defines the relative weight of the second, regularization term; the superscript (x) denotes that the nearest neighbor weights and values depend on x. Other forms of regularization term may be used, e.g. an L2 regularization, or this term may be omitted. The probability of value $v_k$ may be given, for example, by the output of the parametric model, $g_\theta(h_k)$; e.g. in the case of a classification system, from a logit vector prior to a final softmax layer. Thus a correction to the output may be made by determining a gradient with respect to the parameters of the output network 4 of a loss function, which gradient depends upon an output of the parametric system, for each of a set of nearest neighbors to the query, weighted by the similarity to the query in the embedding space. The gradient is multiplied by a learning rate to determine an adjustment to the parameters of the output network. An example number of gradient adjustment steps is in the range 1-20; an example learning rate is in the range 0.1-1.0.

The updated parameters $\theta^x$ of the output network 4 are then used when processing the current embedding h, where h is the output $f_\gamma(x)$ obtained from the embedding network 2 for given input x. The updated parameters $\theta^x$ are discarded after use. That is, when a subsequent input is queried during inference, the contextual update $\Delta_M(x, \theta)$ is recalculated for the subsequent input and the recalculated values are used by the output network 4 to process the output $f_\gamma(x)$ of the embedding network 2.

Modifying the output network 4 in the way described herein allows the system 1 to output an improved prediction to an unseen example, when the unseen example closely matches examples that have previously been seen during training. For example, the system 1 may be used as a classifier to classify numbers, and may have seen a number of examples of each character from 1 to 9. When the system 1 receives an input, such as the number 7, the memory 3 is queried using the embedding h of the input. The system 1 determines entries in the memory 3 which closely match the input, e.g. other examples of 7. The other examples of 7 are then used to modify the output network 4 such that the output network 4 is more likely to correctly classify the input as the number 7. The use of a memory 3 as described is particular advantageous when there is limited training data available for training the system 1. The contextual update $\Delta_M(x, \theta)$ is such that, as the parametric model becomes better at fitting the training data (and consequently the episodic memories), it self-regulates and diminishes. Therefore, the system 1 is able to generate more accurate outputs when training data is limited, with the effect of the memory 3 gradually reducing as more training data becomes available and is used to train the system 1.

In some implementations the output network 4 may be simpler than the embedding network 2; this can facilitate adapting the output of the neural network system by adapting the parameters of the output network. For example the output network may comprise a last fully-connected layer and/or a softmax output layer of the neural network system. In some implementations the memory may store input data e.g. images from pixels such as raw pixel values, but look-ups may still be based on distance in the embedding space and the embeddings may be periodically re-computed to refresh them.

Figure 5:
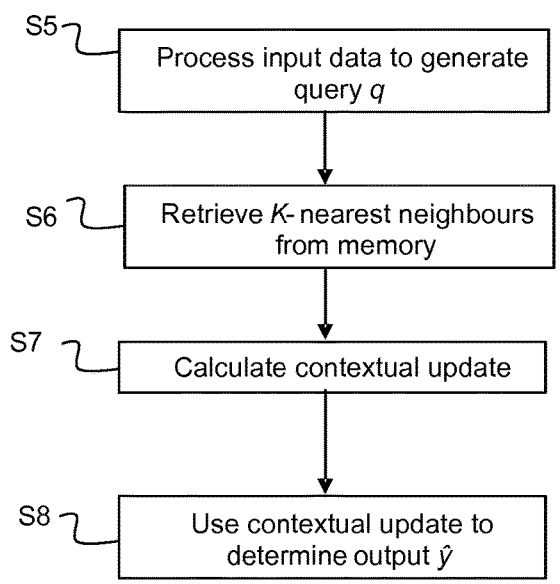
FIG. 5 shows a flow diagram of an example process for using the neural network system in inference.

With reference to FIG. 5, there is now described a method for use of the neural network system 1 in inference.

At step S5, an input x is processed by the embedding network 2 to generate query $q = f_\gamma(x)$.

At step S6, the K-nearest neighbors to the query q are retrieved from the memory 3, and context C is determined, i.e. the keys, values and weights for the K-nearest neighbors.

At step S7, a contextual update $\Delta_M(x, \theta + \Delta_{total})$ is calculated for one or more steps, for example using the formula given above, or a variant thereof. Initially $\Delta_{total} \leftarrow 0$ and at each step $\Delta_{total} \leftarrow \Delta_{total} + \Delta M(x)$.

At step S8, prediction $\hat{y}$ is output, where $\hat{y} = g_{\theta + \Delta_{total}}(h) = g_{\theta^x}(f_\gamma(x))$.

Figure 6:
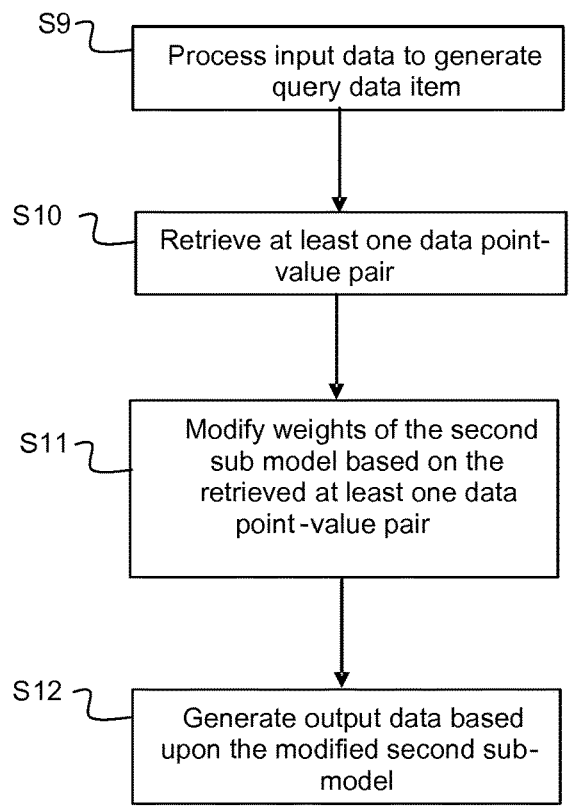
FIG. 6 is a flow diagram of an example process for generating output data from the neural network system.

With reference to FIG. 6, there will now be described a method of processing an input data item using a parametric model to generate output data, where the parametric model comprises a first sub-model and a second sub-model. The first sub model may be the embedding model 2 and the second sub-model may be the output network 4 as described above.

At step S9 the input data is processed by the first sub-model to generate a query data item. For example, the query data item may be query data item 8 shown in FIG. 1.

At step S10 at least one data point-value pair is retrieved from a memory storing data point-value pairs, the at least one data point-value pair being based upon the query data item. The memory may form part of a non-parametric model, and may be the memory 3 described above.

At step S11, weights of the second sub-model are modified based upon the retrieved at least one data point-value pair.

At step S12, the output data is generated based upon the modified second sub-model to generate the output data. The output data may be output data 10 shown in FIG. 1.

Figure 7:
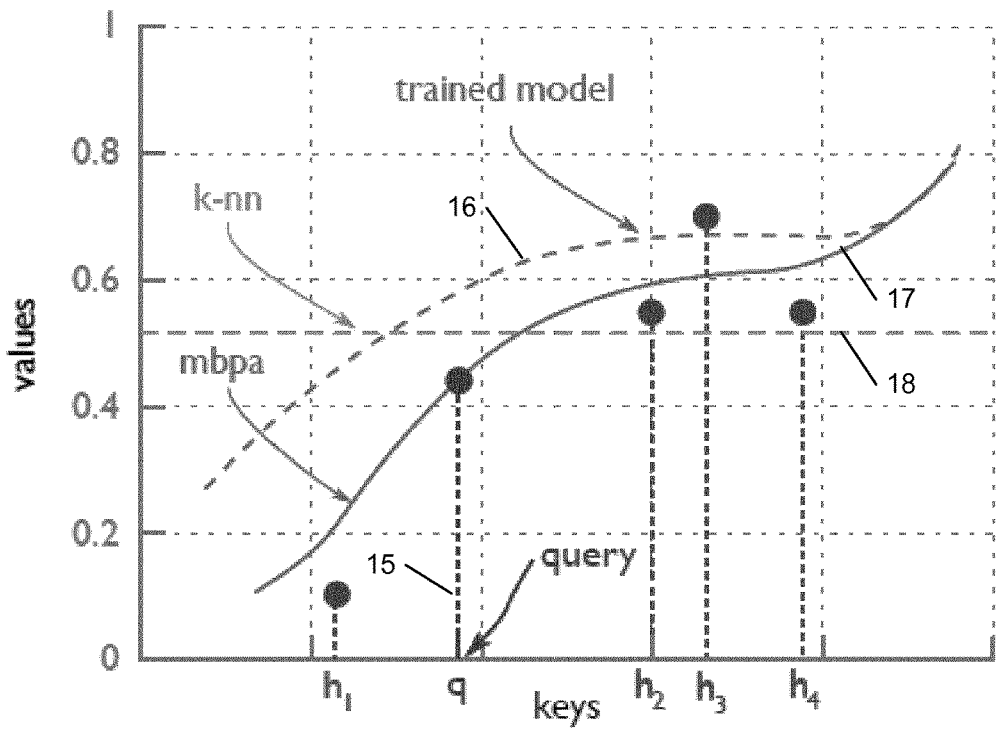
FIG. 7 conceptually illustrates operation of the neural network system.

FIG. 7 conceptually illustrates operation of the neural network system 1 on a regression task: A query 15 has 4 nearest neighbors $h_1 \ldots h_4$ with corresponding values. The parameters of the output network 4 are adjusted from those of the trained model, $g_\theta$ 16, to parameters $g_{\theta^x}$ defining curve 17. This allows a more accurate fit to the data in the episodic memory than, for example, an attention-based model as represented by curve 18.

The neural network system 1 may, for example, be used for any suitable purpose, such as in a language modelling system, an image processing system, or an action selection system. The neural network system 1 may be used for supervised and unsupervised learning tasks. For example, the supervised learning tasks may include classification tasks, such as image processing tasks, speech recognition tasks, natural language processing tasks, word recognition tasks, or optical character recognition tasks. The unsupervised learning tasks may include reinforcement learning tasks where an agent interacts with one or more real or simulated environments to achieve one or more goals.

The input data x may comprise, for example, one or more of: image data, moving image/video data, motion data, speech data, audio data, an electronic document, data representing a state of an environment, and/or data representing an action. For example, the image data may comprise color or monochrome pixel value data. Such image data may be captured from an image sensor such as a camera or LIDAR sensor. The audio data may comprise data defining an audio waveform such as a series of values in the time and/or frequency domain defining the waveform; the waveform may represent speech in a natural language. The electronic document data may comprise text data representing words in a natural language. The data representing a state of an environment may comprise any sort of sensor data including, for example: data characterizing a state of a robot or vehicle, such as pose data and/or position/velocity/acceleration data; or data characterizing a state of an industrial plant or data center such as sensed electronic signals such as sensed current and/or temperature signals. The data representing an action may comprise, for example, position, velocity, acceleration, and/or torque control data or data for controlling the operation of one or more items of apparatus in an industrial plant or data center. These data may, generally, relate to a real or virtual, e.g. simulated, environment.

The output data may similarly comprise any sort of data. For example in a classification system the output data may comprise class labels for input data items. In a regression task the output data may predict the value of a continuous variable, for example a control variable for controlling an electronic or electromechanical system such as a robot, vehicle, data center or plant. In another example of a regression task operating on image or audio data the output data may define one or more locations in the data, for example the location of an object or of one or more corners of a bounding box of an object or the time location of a sound feature in an audio waveform. In a reinforcement learning system the output data may comprise, for example, data representing an action, as described above, the action to be performed by an agent operating an in environment, for example a mechanical agent such as a robot or vehicle.

The data representing an action may comprise, for example, data defining an action-value (Q-value) for the action, or data parameterizing a probability distribution where the probability distribution is sampled to determine the action, or data directly defining the action, for example in a continuous action space. Thus in a reinforcement learning system the neural network system 1 may directly parameterize a probability distribution for an action-selection policy or it may learn to estimate values of an action-value function (Q-values). In the latter case multiple memories and respective output networks may share a common embedding network, to provide a Q-value for each available action.

The system and methods described herein may also be used as a component or module within a larger machine learning system, such as a component or module of a reinforcement learning system.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method of processing an input data item, comprising:
    processing the input data item using a parametric model to generate output data, wherein the parametric model comprises a first sub-model and a second sub-model, the processing comprising:
        processing, by the first sub-model, the input data to generate a query data item;
        retrieving, from an external memory storing data point-value pairs, at least one data point-value pair based upon the query data item;
        modifying weights of the second sub-model using the at least one data-point value pair that was retrieved based upon the query data item without modifying weights of the first sub-model; and
        processing the query data item using the second sub-model in accordance with the modified weights to generate the output data.

2. The method as claimed in claim 1 wherein the parametric model comprises a neural network, and wherein the first and second sub-models comprise first and second sub-networks of the neural network.

3. The method according to claim 2, wherein modifying the weights of the second sub-network using the at least one data-point value pair that was retrieved based upon the query data item comprises generating a plurality of weights for the second sub-network.

4. The method according to claim 3, wherein the plurality of weights are generated based upon a relationship between a data point and a value of the data point-value pairs.

5. The method according to claim 2, wherein modifying the weights of the second sub-network using the at least one data-point value pair that was retrieved based upon the query data item comprises minimizing a loss function, wherein the loss function is based upon a relationship between the at least one data point-value pair and the second sub-network.

6. The method according to claim 5, wherein the loss function is further based upon the query data item.

7. The method according to claim 6, wherein the loss function is weighted based upon a relationship between the query data item and the data-point value pair.

8. The method according to claim 1, wherein the query data item comprises a hidden state of the first sub-model.

9. The method according to claim 1, wherein the external memory comprises an episodic memory.

10. The method according to claim 2, wherein the first sub-network comprises a first plurality of first neural network layers and the second sub-network comprises one or more second neural network layers, wherein the number of first neural network layers is greater than the number of second neural network layers.

11. The method according to claim 2, wherein the data point-value pair comprises:
    a data point of the data point-value pair associated with a hidden state of the first sub-network; and
    a value of the data point-value pair associated with an output of the second sub-network for the data point-value pair.

12. The method according to claim 1, further comprising resetting the second sub-model after the output data is generated using the second sub-model in accordance with the modified weights.

13. The method according to claim 1, wherein the input data item is processed as part of a reinforcement learning system.

14. The method of claim 1, wherein the input data item is a data item associated with data of a category selected from the group consisting of: image data, video data, motion data, speech data, audio data, an electronic document, data representing a state of an environment and data representing an action.

15. A system comprising one or more computers and one or more storage devices storing instructions that when executed by the one or more computers cause the one or more computers to perform operations for processing an input data item, the operations comprising:
    processing the input data item using a parametric model to generate output data, wherein the parametric model comprises a first sub-model and a second sub-model, the processing comprising:

processing, by the first sub-model, the input data to generate a query data item;

retrieving, from an external memory storing data point-value pairs, at least one data point-value pair based upon the query data item;

modifying weights of the second sub-model using the at least one data-point value pair that was retrieved based upon the query data item without modifying weights of the first sub-model; and processing the query data item using the second sub-model in accordance with the modified weights to generate the output data.

16. One or more non-transitory computer storage media storing instructions that when executed by one or more computers cause the one or more computers to perform operations for processing an input data item, the operations comprising:

processing the input data item using a parametric model to generate output data, wherein the parametric model comprises a first sub-model and a second sub-model, the processing comprising:

processing, by the first sub-model, the input data to generate a query data item;

retrieving, from an external memory storing data point-value pairs, at least one data point-value pair based upon the query data item;

modifying weights of the second sub-model using the at least one data-point value pair that was retrieved based upon the query data item without modifying weights of the first sub-model; and processing the query data item using the second sub-model in accordance with the modified weights to generate the output data.

17. The system according to claim 15 wherein the parametric model comprises a neural network, and wherein the first and second sub-models comprise first and second sub-networks of the neural network.

18. The system according to claim 17, wherein modifying the weights of the second sub-network using the at least one data-point value pair that was retrieved based upon the query data item comprises generating a plurality of weights for the second sub-network.

19. The system according to claim 18, wherein the plurality of weights are generated based upon a relationship between a data point and a value of the data point-value pairs.

20. The system according to claim 17, wherein modifying the second sub-network using the at least one data-point value pair that was retrieved based upon the query data item comprises minimizing a loss function, wherein the loss function is based upon a relationship between the at least one data point-value pair and the second sub-network.

21. The method according to claim 1, further comprising adding the output data to the external memory.

* * * * *